3,102,872
RESINOUS COMPOSITIONS OF MATTER AND
METHODS FOR PREPARING SAME
Arthur W. Carlson and George C. Schweiker, Chicago, Ill., assignors to Velsicol Chemical Corporation, Chicago, Ill., a corporation of Illinois
No Drawing. Filed June 24, 1959, Ser. No. 822,448
17 Claims. (Cl. 260—47)

This invention relates to new epoxy resin compositions. In particular, this invention relates to cured epoxy resin compositions produced by reacting 1,2,3,4-cyclopentanetetracarboxylic dianhydride and a polyepoxide compound.

The use of epoxy resins has increased substantially in the past few years and has spread to a wide variety of applications, including castings, epoxy/glass laminates and protective coatings. In order to be of ultimate value for these applications the epoxy resin must be thermoset or cross-linked. This type of material is preparable by the curing of materials containing a plurality of epoxy groups, hereinafter referred to as polyepoxide compounds or polyepoxides.

A wide variety of polyepoxide compounds has been and can be utilized for this purpose, the preponderance thereof being diepoxides. Perhaps the most commercially available materials in this classification are the reaction products of an epihalogenhydrin, usually epichlorohydrin, and a bisphenol, particularly 2,2-bis(4,4'-hydroxyphenyl)-propane. These materials are sold under various trade names such as Epon and Araldite. Depending on the proportions and exact identities of the reactants, this reaction product can be a solid or liquid, having an epoxide equivalent (gram of material per oxirane oxygen group) of varying magnitude. In addition, other compounds containing a plurality of oxirane oxygen groups are within this classification, with diepoxides being a preferred group.

In order to be of commercial value it is necessary for the curing reaction to proceed at a satisfactory rate, to prepare a product of reasonable pot life and for the product to have good physical, chemical and/or electrical properties. Of course, the ultimate use of the product dictates which of the properties are of importance and the degree of any specific property required for the epoxy resin composition.

Often it has been found that the commercially available cured epoxy resin compositions lack one or more of the desired properties, usually heat stability, impact resistance, high heat distortion temperature, and chemical resistivity. Further, these materials may lack a specific combination of desirable properties, although they may possess certain properties in satisfactory proportions. In addition, the reactivity of many known curing agents is either too low, so as to prolong the curing time, or too high, unreasonably shortening the pot life of the material.

It is therefore an object of the present invention to produce epoxy resin compositions having superior properties, particularly in regard to heat stability, impact resistance, and a high heat distortion temperature.

Still another object of the present invention is to provide a method for the curing of epoxy compounds utilizing curing agents of optimum reactivity.

Other objects of the present invention will become apparent from the ensuing description.

Unexpectedly, it has been found, in accordance with the present invention, that epoxy resin compositions produced by the utilization of 1,2,3,4-cyclopentanetetracarboxylic dianhydride as the curing agent exhibit superior physical, chemical and electrical characteristics. Despite the multifunctionality of this compound, its reactivity is sufficiently slow to sustain the polyepoxy composition reaction mixture's pot life at a reasonable level for commercial purposes. In general, dianhydrides are highly reactive materials, often necessitating their use in a diluted manner. One method of dilution is the use of the dianhydride in combination with less reactive compounds, such as ordinary monoanhydrides. This use of other less reactive materials in combination with a dianhydride has the unfortunate consequence of destroying or severely minimizing the desirable properties attributed to the epoxy resin composition by the dianhydride. The reactivity of 1,2,3,4-cyclopentanetetracarboxylic dianhydride permits its application by itself as a curing agent for polyepoxy compounds, imparting thereto superior chemical, electrical and physical properties, particularly heat stability, impact resistance, and high heat distortion temperature.

The preparation of 1,2,3,4-cyclopentanetetracarboxylic dianhydride is reported in the literature, cf., Alder and Schneider, Ann. 524, 189–202 (1936), wherein it is prepared by the two-step process of first reacting carbic acid and potassium permanganate and then reacting the product thereof with acetyl chloride. While the 1,2,3,4-cyclopentanetetracarboxylic dianhydride used in the ensuing examples was prepared by the nitric acid oxidation of carbic anhydride (4,5-dicarboxylicbicycloheptene), the mode of preparation is not critical to the present invention.

In the curing of the epoxide compounds in accordance with the present invention it is theoretically necessary to react 0.25 mol of 1,2,3,4-cyclopentanetetracarboxylic dianhydride per epoxide equivalent of the polyepoxide composition. Thus, from about 0.1 to 0.5 mol of 1,2,3,4-cyclopentanetetracarboxylic dianhydride per epoxide equivalent of the polyepoxide compound is operable and from about 0.2 to 0.3 mol of 1,2,3,4-cyclopentanetetracarboxylic dianhydride is a preferred operation of the present invention.

In order to properly cure the polyepoxide composition with 1,2,3,4-tetracarboxycyclopentane dianhydride it is necessary to heat the reaction mixture to an elevated temperature, preferably between about 100° C. and 200° C. for a sufficient time period as determined in part by the identity of the polyepoxide composition, equipment, preferred properties, etc.

The mixing is not restricted to a set procedure. One acceptable procedure is to mix the ingredients together at relatively low temperatures (20–100° C.) and then pour the mixture into a mold at the desired curing temperature. If the polyepoxide composition is a solid, then it must be melted prior to its being mixed with the dianhydride.

No elaborate equipment is necessary for the performance of the present invention, and thus standard equipment for the curing of resinous composition can be used. While it is generally undesirable and unnecessary to use other materials, they may be added to the polyepoxy composition-dianhydride reaction mixture.

The following examples illustrate the performance of the present invention, but the present invention is not expressly limited thereto.

*Example 1*

Epon 828 [1] (25 grams) was placed in a glass reaction vessel equipped with thermometer, stirrer and heating mantle and was heated to 165° C. 1,2,3,4-cyclopentanetetracarboxylic dianhydride (7.2 grams) was added thereto and the mixture stirred for about 15 minutes. The cleared solution was then poured into a test tube where it gelled.

---

[1] Epon 828 is the trade name of Shell Chemical Corp. for a liquid epoxy resin having an epoxide equivalent of 1 mol per 200 grams of resin prepared by the condensation reaction of 2,2-bis(4,4'-hydroxyphenyl)propane and epichlorohydrin.

Example 2

Epon 828 (25 grams) was placed in a glass reaction vessel equipped with thermometer, stirrer and heating mantle and was heated to 165° C. 1,2,3,4-cyclopentanetetracarboxylic dianhydride (7.2 grams) which had been mechanically ground was added thereto and the mixture stirred for about 15 minutes. Then the reaction mixture was poured into a preheated tube and placed in an oven at 200° C. for about 16 hours. At that time the material had bodied and was found to be a hard, tough product.

Example 3

Epon 828 (25 grams) was placed in a glass reaction vessel equipped with thermometer, stirrer and heating mantle and was heated to 165° C. Powdered 1,2,3,4-cyclopentanetetracarboxylic dianhydride (11.1 g.) was added thereto and the mixture stirred for about 15 minutes. Then the reaction mixture was poured into a preheated tube and placed in an oven at 200° C. for about 64 hours. After removal from the oven the product was found to be a hard, tough casting.

Example 4

Epon 828 (25 grams) was placed in a beaker with a constant temperature bath maintained at 150° C. Powdered 1,2,3,4-cyclopentanetetracarboxylic dianhydride (11.1 grams) was added thereto and the reaction mixture stirred for about 30 minutes. Then the beaker was removed from the bath and placed in an oven at 200° C. temperature for about 16 hours. At that time the cured product was extremely hard as evidenced by the inability to dent it with a file even at 200° C.

Example 5

In order to determine the pot life of the reaction mixture, Epon 828 (25 grams) was placed in a beaker contained in a constant temperature bath at 160° C. Powdered 1,2,3,4-cyclopentanetetracarboxylic dianhydride (7.2 grams) was added thereto and the mixture stirred for about 18 minutes at which time it gelled.

Example 6

Epon 1001 [2] (62.5 grams) is placed in a glass reaction vessel equipped with thermometer, stirrer and heating mantle and is heated to about 160° C. 1,2,3,4-cyclopentanetetracarboxylic dianhydride (7.2 grams) is added thereto and the mixture stirred for about 15 minutes. Then the reaction mixture is poured into a preheated tube and placed in an oven at 180° C. for about 16 hours. At that time the product is determined to be a hard, tough casting.

Example 7

1,2,5,6-dicyclopentane diepoxide (9.0 grams) is placed in a glass reaction vessel equipped with thermometer, stirrer and heating mantle and is heated to about 160° C. Powdered 1,2,3,4-cyclopentanetetracarboxylic dianhydride (7.2 grams) is added thereto and the mixture stirred for about 15 minutes. Then the reaction mixture is poured into a preheated tube and placed in an oven at 220° C. for 12 hours. At that time the product is determined to be a hard, tough casting.

Example 8

Bis-cyclopentanyl ether diepoxide (11.5 grams) is placed in a glass reaction vessel equipped with thermometer, stirrer and heating mantle and is heated to about 160° C. 1,2,3,4-cyclopentanetetracarboxylic dianhydride (7.2 grams) is added thereto and the mixture stirred for about fifteen minutes. Then the reaction mixture is poured into a preheated tube and placed in an oven at 200° C. for 20 hours. At that time the product is determined to be a hard, tough casting.

Example 9

Epoxide 201 [3] (17 grams) is placed in a glass reaction vessel equipped with thermometer, stirrer and heating mantle and is heated to about 160° C. 1,2,3,4-cyclopentanetetracarboxylic dianhydride (7.2 grams) is added thereto and the mixture stirred for about fifteen minutes. Then the reaction mixture is poured into a preheated tube and placed in an oven at 200° C. for 24 hours. At that time the product is determined to be a hard, tough casting.

The present resinous compositions can be used as they are prepared, i.e., in the cast condition. If desired, they can be used in coatings or for impregnating textiles, paper, glass cloth, and other like materials. Also, the present resins can be used in preparing laminates, adhesives and the like. Filler materials can be incorporated therein when desired. Because of their high heat distortion temperatures and superior general physical and electrical properties, coupled with superior chemical resistance, the present products have wide utility.

We claim:

1. A composition of matter comprising the reaction product of a polyepoxide containing more than one oxirane oxygen atom and 1,2,3,4-cyclopentanetetracarboxylic dianhydride, the dianhydride reactant being present in the dianhydride form.

2. A composition of matter comprising the reaction product of a diepoxide containing two oxirane oxygen atoms and 1,2,3,4-cyclopentanetetracarboxylic dianhydride, the dianhydride reactant being present in the dianhydride form.

3. A composition of matter comprising the reaction product of (1) the reaction product containing more than one oxirane oxygen atom of an epihalogenhydrin and a bis-phenol and (2) 1,2,3,4-cyclopentanetetracarboxylic dianhydride, the dianhydride reactant being present in the dianhydride form.

4. A composition of matter comprising the reaction product of a polyepoxy compound containing more than one oxirane oxygen atom and from about 0.1 to about 0.5 mol of 1,2,3,4-cyclopentanetetracarboxylic dianhydride per epoxide equivalent of the polyepoxide compound, the dianhydride reactant being present in the dianhydride form.

5. A composition of matter comprising the reaction product of a diepoxy compound containing two oxirane oxygen atoms and from about 0.1 to about 0.5 mol of 1,2,3,4-cyclopentanetetracarboxylic dianhydride per epoxide equivalent of the diepoxide compound, the dianhydride reactant being present in the dianhydride form.

6. A composition of matter comprising the reaction product of (1) the reaction product containing more than one oxirane oxygen atom of an epihalogenhydrin and 2,2-bis(4,4'-hydroxyphenyl)propane and (2) from about 0.2 to about 0.3 mol of 1,2,3,4-cyclopentanetetracarboxylic dianhydride per epoxide equivalent of the diepoxide compound, the dianhydride reactant being present in the dianhydride form.

7. A composition of matter comprising the reaction product of (1) the reaction product containing more than one oxirane oxygen atom of epichlorohydrin and 2,2-bis(4,4'-hydroxyphenyl)propane and (2) about 0.25 mol of 1,2,3,4-cyclopentanetetracarboxylic dianhydride per epoxide equivalent of (1), the dianhydride reactant being present in the dianhydride form.

8. A composition of matter comprising the reaction product of bis-cyclopentyl ether diepoxide and about 0.4 to about 0.6 mol of 1,2,3,4-cyclopentanetetracarboxylic dianhydride per mol of bis-cyclopentyl ether diepoxide,

---

[2] Epon 1001 is the trade name of Shell Chemical Corp. for a solid epoxy resin having an epoxide equivalent of 1 mol per 450–525 grams of resin, prepared by the condensation reaction of 2,2-bis(4,4'-hydroxyphenyl)propane and epichlorohydrin.

[3] Epoxide 201 is the trade name of Union Carbide Chemicals Company for 3,4-epoxy-6-methylcyclohexylmethyl-3,4-epoxy-6-methylcyclohexanecarboxylate.

the dianhydride reactant being present in the dianhydride form.

9. A composition of matter comprising the reaction product of dicyclopentadiene diepoxide and about 0.4 to about 0.6 mol of 1,2,3,4-cyclopentanetetracarboxylic dianhydride per mol of dicyclopentadiene diepoxide, the dianhydride reactant being present in the dianhydride form.

10. A composition of matter comprising the reaction product of 3,4 - epoxy - 6 - methylcyclohexylmethyl - 3,4-epoxy-6-methylcyclohexanecarboxylate and from about 0.4 to about 0.6 mol of 1,2,3,4-cyclopentanetetracarboxylic dianhydride per mol of the epoxy compound, the dianhydride reactant being present in the dianhydride form.

11. A method for the curing of a polyepoxide containing more than one oxirane oxygen atom which comprises heat-reacting it with 1,2,3,4-cyclopentanetetracarboxylic dianhydride, the dianhydride reactant being present in the dianhydride form.

12. Method of claim 11 wherein 1,2,3,4-cyclopentane dianhydride is present in quantities of from about 0.4 to about 0.6 mol per epoxide equivalent of the polyepoxide compounds based on its oxirane atoms.

13. Method of claim 11 wherein the polyepoxide compound containing more than one oxirane oxygen atom is the reaction product of epichlorohydrin and 2,2-bis(4,4'-hydroxyphenyl)propane.

14. Method of claim 11 wherein the polyepoxide compound is bis-cyclopentyl ether diepoxide.

15. Method of claim 11 wherein the polyepoxide compound is dicyclopentadiene diepoxide.

16. Method of claim 11 wherein the polyepoxide compound is 3,4-epoxy-6-methylcyclohexylmethyl-3,4-epoxy-6-methylcyclohexanecarboxylate.

17. Method of claim 11 wherein the dianhydride is the sole curing agent.

References Cited in the file of this patent
UNITED STATES PATENTS

| | | |
|---|---|---|
| 2,324,483 | Castan | July 20, 1943 |
| 2,768,153 | Shokal | Oct. 23, 1956 |
| 2,965,610 | Newey | Dec. 20, 1960 |

OTHER REFERENCES

Charlton: "Modern Plastics," vol. 32, No. 1, pages 155–161 and 240–243 (September 1954).

Weiss: "Industrial and Engineering Chemistry," vol. 49, pages 1089–1090 (July 1957).

Lee et al.: "Epoxy Resins," McGraw-Hill Book Co., Inc., N.Y., 1957, pages 130–131 relied on.